United States Patent [19]

Moore et al.

[11] Patent Number: 4,871,291
[45] Date of Patent: Oct. 3, 1989

[54] RETAINER BLADE ARM LOCKING MEANS FOR WHEEL LIFT APPARATUS

[75] Inventors: Vernon S. Moore, Ringgold, Ga.; Reed K. Hamman, Newbern, Tenn.

[73] Assignee: Holmes International Inc., Chattanooga, Tenn.

[21] Appl. No.: 203,271

[22] Filed: Jun. 7, 1988

[51] Int. Cl.⁴ .............................................. B60P 3/12
[52] U.S. Cl. .................... 414/563; 280/402; 188/32; 410/30; 410/19; 403/330
[58] Field of Search ............... 280/402; 414/563, 429, 414/11, 426, 427; 403/330; 410/9, 19, 30, 66

[56] References Cited

U.S. PATENT DOCUMENTS

| | | | |
|---|---|---|---|
| 3,189,127 | 6/1965 | Karnow et al. | 188/32 |
| 3,581,846 | 6/1971 | Janus | 188/32 |
| 4,034,873 | 7/1977 | Haring | 414/563 |
| 4,246,984 | 1/1981 | Seay et al. | 410/19 X |
| 4,637,623 | 1/1987 | Bubik | 414/426 X |
| 4,697,670 | 10/1987 | Arruda | 403/330 X |
| 4,741,661 | 5/1988 | Carey | 280/402 X |
| 4,750,856 | 6/1988 | Lapiolahti | 414/563 |
| 4,775,285 | 10/1988 | Zackovich | 280/402 X |
| 4,793,763 | 12/1988 | Bubik | 280/402 X |

FOREIGN PATENT DOCUMENTS 1265771 4/1968 Fed. Rep. of Germany ........ 410/30
129424 1/1978 German Democratic Rep. ... 410/30

Primary Examiner—Frank E. Werner
Attorney, Agent, or Firm—Alan Ruderman

[57] ABSTRACT

Apparatus for wheel lift towing vehicles for supporting the tires of a vehicle lifted and towed thereby includes a tire support cradle having front and rear members for respectively engaging the front and rear surface portions of a tire of a vehicle. The rear support member includes an elongated arm and a wheel support member. The arm is adjustably positioned in a receptacle carried by a support beam which also carries the front member of the cradle, and is secured in the receptacle by a locking bracket which is pivotably mounted on the top of the receptacle and adapted to pivot between an unlocked position to a locking position. In the unlocked position the bracket does not interfere with movement of the arm. The bracket includes a leg which carries a locking pin. In the locking position lateral movement of the arm is precluded and the pin is inserted into a bore in the arm to lock the arm against longitudinal and lateral movement.

20 Claims, 2 Drawing Sheets

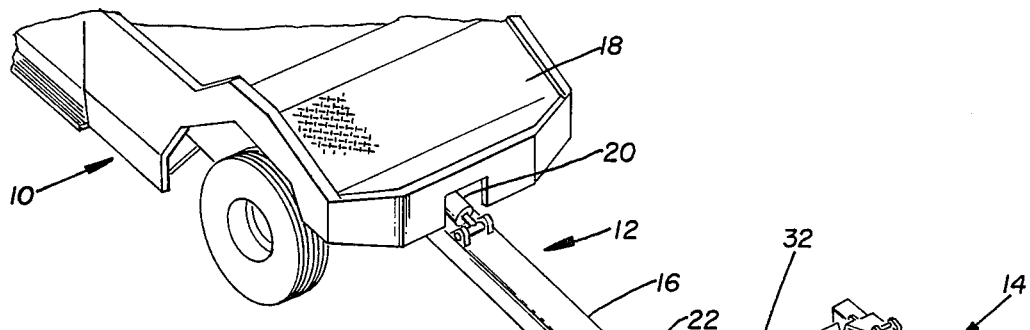
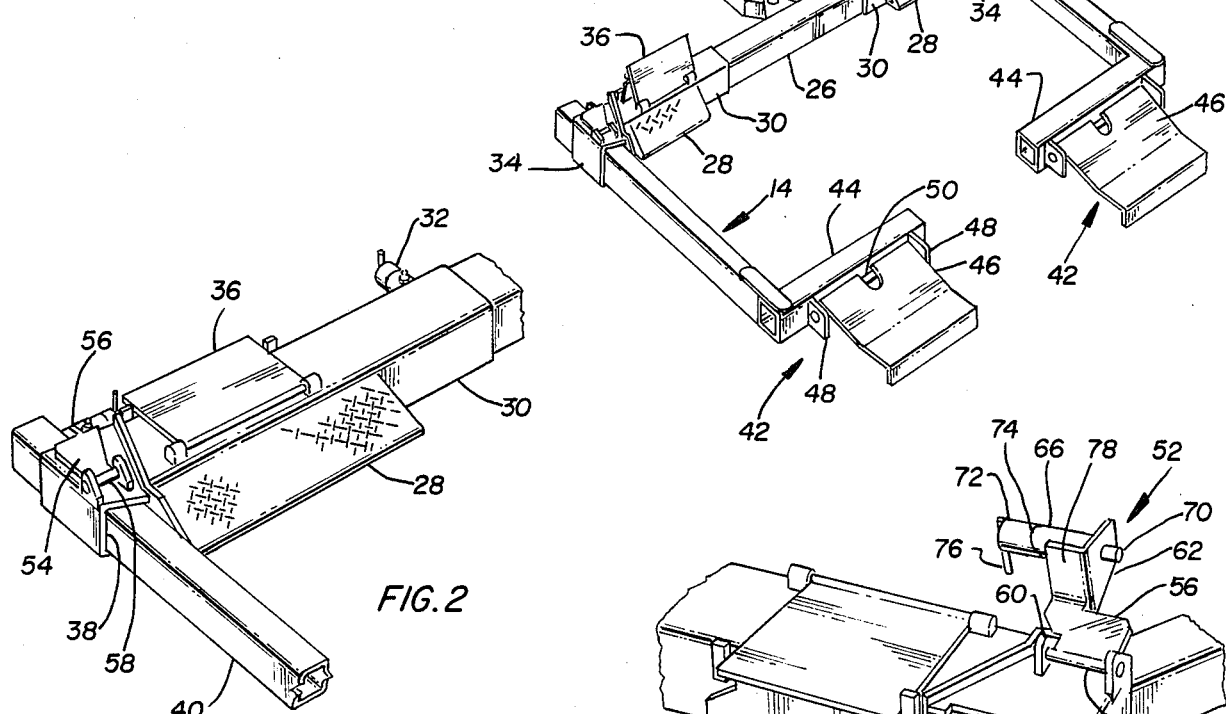
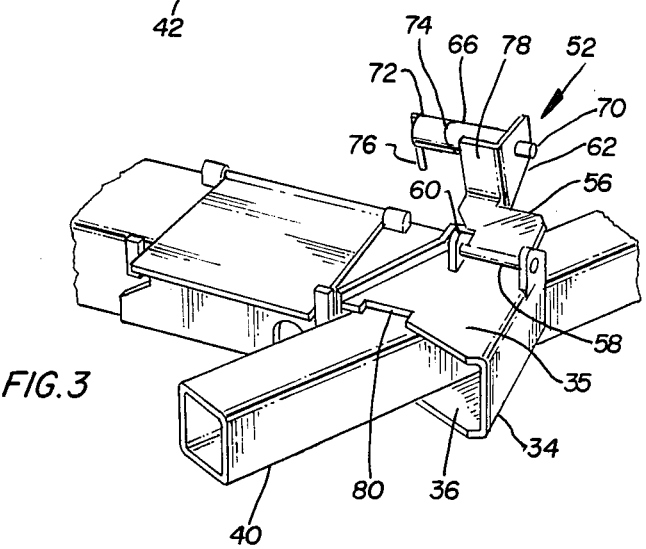
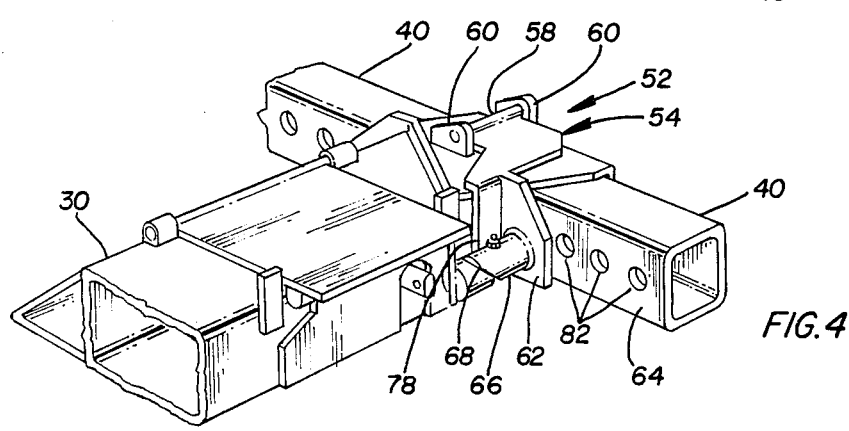

RETAINER BLADE ARM LOCKING MEANS FOR WHEEL LIFT APPARATUS

BACKGROUND OF THE INVENTION

This invention relates to towing vehicles and more particularly to means for locking the arm supporting the wheel engaging blade which support the rear portion of the tires of a vehicle to be lifted and towed by wheel lift apparatus.

Because of the large amount of plastic material used on the front and rear portions and bumpers of recent model automobiles, developments in the art of lifting and towing disabled vehicles by a towing vehicle have been directed toward what is known in the art as "wheel lift" devices, which engage and lift the front or rear tires of a disabled vehicle. Examples of towing apparatus incorporating such devices are illustrated in Wagner U.S. Pat. No. 3,182,829; Bubik U.S. Pat. No. 3,897,879; Cannon et al U.S. Pat. No. 4,451,193; Brown U.S. Pat. No. 4,473,334; Porter et al U.S. Pat. No. 4,573,857; Hamman U.S. Pat. No. 4,634,337; Bubik U.S. Pat. No. 4,637,623 and Holmes U.S. Pat. No. 4,679,978. As disclosed in each of these patents the tires of a disabled vehicle are disposed within the well of some form of cradle, the cradle having members which engage and support the front and rear of the tires carried therein.

The wheel supporting cradles generally have a fork of a substantially U-shaped configuration in plan, the legs of the cradle opening either inwardly, outwardly or rearwardly. In the later instance the open position is closed by a retaining member subsequent to the tire being disposed within the well, the retaining member engaging the rear of the tire. In the former cases, the rear of the tire is engaged by an arm, commonly known in the art as an "L" arm since it has that configuration, and such arm may have an upstanding arcuate contour conforming somewhat to the shape of the tire so as to provide greater support by the larger surface contact with the tire. Examples of the former "L" arm configurations are illustrated in at least the aforesaid Porter et al and Holmes patent, while examples of the latter "L" arm configurations are illustrated in at least Wagner and the Bubik '623 patents.

When a disabled vehicle is being towed, it is highly desirable that the tires rest securely within the cradle so that the momentum of the disabled vehicle does not result in the tires rolling and disengaging from the cradle when the towing vehicle accelerates or stops. On acceleration, the disabled vehicle and the tires tend to surge rearwardly, but upon stopping of the towing vehicle, the disabled vehicle and the tires tend to surge forwardly. Accordingly, it is highly desirable to have enlarged wheel engaging feet at the front and rear of the cradle.

In copending U.S. patent application Ser. No. 07/183,044 filed on Apr. 18, 1988, by Walter G. Lock and assigned to Holmes International Inc., the same assignee of the present application, there is disclosed a pivotably foldable ramp juxtaposed adjacent to the fixed ramp at the front of the cradle, the foldable ramp providing an extension of the fixed ramp, and thus an enlarged foot at the front, when in an operative position, yet may be pivotably folded to an inoperative position which permits the support member on which it is mounted to enter beneath low ground clearance vehicles without presenting an obstacle thereto.

However, as aforesaid, it is also desirable to have an enlarged foot for supporting the rear surface of the wheel or tire of the vehicle to be towed. Although the Bubik '623 patent does disclose an enlarged upstanding foot or blade, it requires that the arm to which the foot is attached be rotated a substantial amount for the foot to be received behind the rear of the tire, and it must then be lifted in order to adjust the arm longitudinally to engage the rear surface of the tire with the blade. When positioning the support arm it is more natural to merely slide the arm forwardly to engage the blade against the rear surface of the wheel. However, with the small wheel well clearances of recent automobiles this cannot be accomplished with the prior art blades such as that illustrated in Bubik '623 since the blade provides an obstacle for substantial movement of the arm so that it must be rotated to position the blade to closely adjacent the rear surface of the wheel A solution to these and additional difficulties are provided by the apparatus disclosed in copending U.S. patent application Ser. No. 07/194,855 filed on May 17, 1988 by Walter Lock and Vernon Moore, the latter being one of the coinventors herein, and assigned to Holmes International Inc., the same assignee as that of the present application. In that application there is provided means for supporting the rear surface of the tire including a bar secured to the elongated "L" arm and a foldable plate carried by the bar for moving between a substantially upright operative position and a lowered position for providing clearance for entry of the rear support member beneath the vehicle and behind the tire, and for providing other operational features. The elongated arm is telescopically adjustably carried in a receptacle secured to a support beam which also carries the front member of the cradle. Once the arm is adjustably positioned for lifting and towing, a pin is inserted through a hole in the top of the receptacle and through a selected one of a number of bores in the upper surface of the arm to thereby lock the arm to the support beam.

Difficulties are sometimes presented when manipulating the arm to an adjusted position for insertion of the locking pin through the receptacle and the arm. Additionally, since the pin is inserted vertically and extends through the bottom surface of the receptacle, if the tow bar or support beam is on an unlevel surface, it is sometimes difficult to remove the pin when required for subsequent operations.

SUMMARY OF THE INVENTION

Consequently, it is a primary object of the present invention to provide a locking device for securing the elongated arm which carries the rear wheel surface support member to the receptacle within which the arm is adjustably carried by the wheel lift support beam of wheel lift apparatus, the locking device being easily and simply operable.

It is another object of the present invention to provide for a wheel lift towing device, a tire supporting cradle carried by a transverse support beam, the cradle having an elongated arm adjustably carried by the beam and including a leg spaced from the beam for disposition behind the tire of a vehicle to be towed while the beam is disposed in front of the tire, the leg carrying tire engaging means, and the arm being secured to the support beam by a simply operated pivotably mounted securing member carrying a locking pin, the locking member acting to position the arm in a transverse direction and the pin acting to secure the arm in both the transverse direction and the direction of elongation thereof.

Accordingly, the present invention provides apparatus for wheel lift towing vehicles for supporting the tires of a vehicle lifted and towed thereby, the apparatus including a tire support cradle having front and rear members for respectively engaging the front and rear surface portions of a tire of the vehicle. The rear support member includes an elongated arm and wheel support member, the elongated arm being adjustably carried in a receptacle supported by a support beam which also carries the front member of the cradle. The arm may be adjustably positioned in the receptacle and secured therein by means of a locking bracket pivotably mounted for movement relative to the receptacle and adapted to pivot from a position where it does not interfere with movement of the arm to a position where a portion of the bracket substantially abuts a lateral surface of the arm to preclude lateral movement thereof, said portion carrying a locking pin which may be readily inserted within a bore in the arm to lock the arm against longitudinal and lateral movement.

In a preferred form of the invention the locking bracket is pivotably mounted on the top of the receptacle and has a portion thereof which rests on the top surface of the receptacle when in the locked position. Another portion of the bracket engages and is trapped by a portion of the mouth of the receptacle so as to provide a rigid connection between the receptacle and the arm. The pin preferably is spring biased into the locking position and is mounted within a housing having a cam surface which permits the pin to be readily inserted and retracted merely by turning a lever to which the pin is connected.

BRIEF DESCRIPTION OF THE DRAWINGS

The particular features and advantages of the invention as well as other objects will become apparent from the following description taken in connection with the accompanying drawings, in which:

FIG. 1 is a rear perspective view of a portion of a towing vehicle looking forwardly having wheel lift apparatus illustrated as partly extended and incorporating wheel engaging cradles including portions thereof constructed in accordance with the principles of the present invention;

FIG. 2 is a fragmentary rear perspective view looking forwardly of the front end portion of a cradle having locking means for securing the arm which carries the rear wheel surface support element, the locking means being illustrated in the locking position;

FIG. 3 is a fragmentary front perspective view looking rearwardly illustrating the locking means in the lifted or unlocked position;

FIG. 4 is a front perspective view as viewed from the opposite side of FIG. 4 with the locking means in the locked position;

DESCRIPTION OF THE PREFERRED EMBODIMENTS

Figure 5:
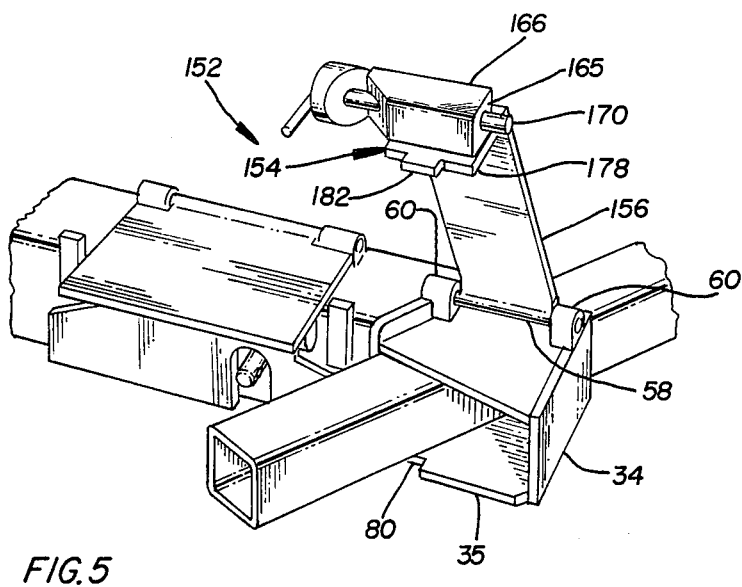
FIG. 5 is a view similar to FIG. 3, but of a second embodiment of the invention.

Referring to the drawings, a towing vehicle 10 is illustrated having wheel lifting apparatus 12 incorporating wheel supporting cradles 14 constructed in accordance with the principles of the present invention. The wheel lifting apparatus 12 includes a hollow boom housing 16 which may be extended by extension means disposed within the bed 18 of the towing vehicle, and may be tilted by tilting means including a tilt cylinder 20 as fully disclosed in the aforesaid Hamman U.S. Pat. No. 4,634,337 assigned to the common assignee of the present invention. Telescopically disposed within the lifting boom housing 16 is at least one inner or lifting boom 22 which may be extended and retracted relative to the lifting boom housing 16 in conventional manner.

Mounted at the free end of the inner boom 22 by means of a journal pin 24 is a tow bar or cross beam 26 which may pivot relative to the inner boom 22 about the journal pin 24. At each end of the transversely extending tow bar is one of the wheel supporting cradles 14.

The wheel lift cradles 14 may be formed as separate attachments telescopically received on the ends of the tow bar 26, or each cradle may have elements formed integral with the tow bar. In either instance the cradle includes a fixed front support ramp 28 secured to a support member, the support member either being the tow bar 26, but preferably are hollow housings 30 conforming in shape to the tow bar and telescopically received on the opposed ends of the tow bar and locked thereon in transversely selected positions by spring biased pins 32 or the like. Each cradle includes a receptacle 34 preferably fixed at the outer end of the support member 30 at the outboard side of the ramp 28, the receptacle comprising a hollow body having a rectangular passageway tapering in the horizontal plane from an enlarged substantially vertically disposed open end 36 facing the towing vehicle toward a smaller open end 38 facing the vehicle to be towed, but having a substantially fixed height in the vertical plane. Preferably a foldable extension ramp 36 as described in the aforesaid Lock copending U.S. application Ser. No. 07/183,044 is mounted above the fixed ramp 28. A rear wheel support member, i.e., a member for supporting the rear surface of the tire to be carried in the cradle includes an elongated arm 40 having a rectangular configuration which is telescopically positioned within the receptacle 34, and wheel engaging blade means 42. Preferably the blade means 42, as described in the aforesaid Lock and Moore copending U.S. application Ser. No. 07/194,855, includes a fixed leg in the form of a bar 44 extending substantially normal to the arm 40 and spaced from the ramp 28 so that the bar 42 may be disposed behind a tire when the ramp is disposed in the front thereof, and the leg or bar 42 carries a plate 46 mounted for movement about an axis substantially parallel to the bar 44. As illustrated, each bar 44 has a pair of lugs 48 fastened to the rear surface thereof for carrying a rod 50 having an axis of elongation substantially parallel to the bar 44 and preferably normal to the longitudinal axis of the arm 40. The rod 50 is received within a slot defined by a space formed by one or more U-shaped brackets (not illustrated) on a surface of the plate 46 to thereby mount the plate 46 for movement about the substantially horizontal axis of the rod 50 relative to the bar 44 and the arm 40 so that the plate 46 may be positioned in at least one upstanding disposition by lifting the plate or may be positioned in a rearwardly extending lowered disposition as illustrated in FIG. 1, as fully described in the aforementioned copending application of Lock and Moore 07/194,855.

The arm 40 may be slidably moved horizontally longitudinally and manipulated slightly transversely in the receptacle 34 to permit the blade means 42 to engage the rear of the tire of the vehicle to be lifted and towed and the arm is then locked in the receptacle by locking means 52 constructed according to the present invention.

The locking means 52 comprises a bracket member 54 having a planar plate portion 56 which in the locked position lays on the top surface 35 of the receptacle 34, the plate 56 having a pin 58 attached as by welding thereto. The pin 58 is journally received within a pair of spaced lugs or ears 60 secured to the top surface of the receptacle adjacent the rear thereof so that the bracket may be rotated with the pin 58 relative to the ears 60 from the locked position where the plate 56 is disposed on the top surface of the receptacle as illustrated in FIGS. 2 and 4 to a position where it extends substantially upwardly and rearwardly as illustrated in FIG. 3.

In the embodiment of the invention illustrated in FIGS. 1-4, a leg 62 may be formed unitary with or welded to the plate 56 substantially perpendicular thereto and remote from the pin 58. The leg 62 is positioned on the plate 56 such that in the locking position the leg may substantially abut the interior surface 64 of the arm 40 when the plate 56 abuts the top surface of the receptacle. The leg 62 carries a cylindrical plunger housing 66 which is secured to the inwardly facing surface thereof as by welding or the like, the extremity of the housing 66 remote from the leg 62 having an inclined face 68 forming a cam surface. A plunger pin 70 is disposed in the housing 66 and is biased outwardly therefrom through a bore in the end of the housing remote from the face 68 and that bore opens onto another bore formed in the plate 62 for extension of the pin therethrough. Although not illustrated, a spring is disposed about a shoulder on the pin internally of the housing 66, and the end of the pin remote from that which normally projects through the bore in the leg 62 is secured within a plunger pin actuator cam 72 which also has an inclined face 74 similar to the surface 68. A rod 76 or the like may be welded to the plunger pin actuator cam so as to rotate that cam relative to the housing 66 to overcome the bias of the internal spring and draw the pin 70 into the housing 66 or to permit the spring to force the pin 70 outwardly therefrom.

The bracket member 54 includes another leg 78 formed unitary with or welded to the plate 56 substantially perpendicular thereto. In the embodiment illustrated in FIGS. 1-4, the leg 78 is also perpendicular to the leg 62, and when in the locking position, as best illustrated in FIG. 4, when the plate 56 is disposed on the top surface 35 of the receptacle member 34, the leg 78 extends substantially vertically downwardly through an open end cut-out 80 formed in the top 35 of the receptacle 34 at a location adjacent the inwardly facing surface 64 of the arm 40. Thus, when the bracket is pivoted to the locking position, the leg 78 extends through the cut-out 80 and thereby positions and effectively locks the leg 62 and the arm 40 transversely. With the leg 78 so positioned, the arm 40 may be manipulated slightly longitudinally until the pin 70 projects through one of a plurality of holes 82 formed in the inwardly facing surface 64 of the arm 40 to thereby lock the arm both longitudinally and transversely.

In the operation of the device, the bracket 54 is initially disposed in the upward or unlocked position illustrated in FIG. 3 and the bar 44 of the blade means 42 is manipulated by means of the arm 40 until it abuts or is adjacent the rear surface of a tire to be supported by the cradle, and the moveable plate 46 is moved to the upstanding operative position as fully described in the aforesaid copending U.S. application of Lock and Moore 07/194,855. When the arm is properly positioned, the bracket 54 is rotated to the locking position illustrated in FIGS. 2 and 4 so that the leg 78 is positioned within the cut-out 80. The pin 70 may then be extended by turning the rod 76 and thereby the actuator cam 72 so that the pin enters a hole 82 if a hole is disposed in line therewith, or the arm 40 may be moved slightly longitudinally until the pin enters the hole. Locking thus occurs in a very simple manner merely by rotating the bracket 54 and ensuring that the pin 70 is within a hole 82. To unlock the arm 40, the rod 76 together with the actuating cam 72 are turned so that the cam surface 74 rides on the cam surface 68 to retract the pin 70 into the housing 66 so that the bracket 54 may be rotated to an unlocked position where the leg 78 is out of and above the cut-out 80.

Figure 6:
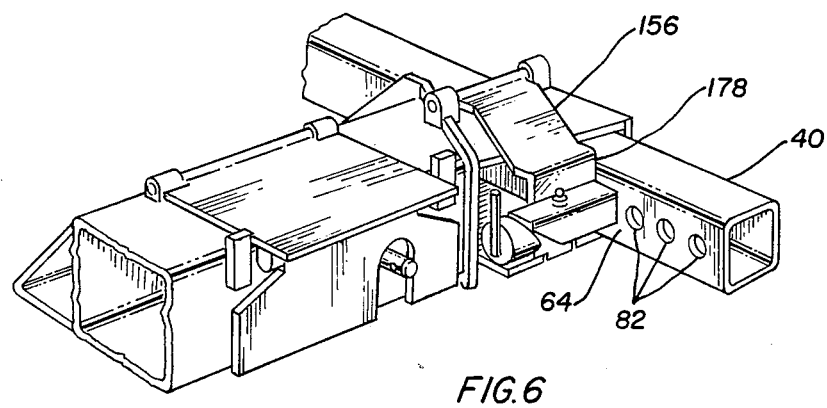
FIG. 6 is a view similar to FIG. 4 of the second embodiment.

A second embodiment, which is preferred because of its lower production cost, is illustrated in FIGS. 5 and 6. Here, the locking means 152 is substantially identical to the locking means 52 in FIGS. 1 through 4 except that the leg 62 is omitted and rather than the plunger housing 66 being cylindrical, a plunger housing 166 having a rectangular configuration is utilized with the face thereof through which the pin 70 extends functioning as the leg 62 in the first embodiment. Thus, as illustrated in FIGS. 5 and 6, the bracket member 154 includes a planar plate portion 156 fast to the pin 58 which is journalled in the ears 60 of the receptacle 34. The bracket member also includes a leg 178 integral with and substantially perpendicular to the plate 156 so that when the plate 156 is disposed on the top surface 35 of the receptacle 34, the leg 178 extends downwardly through the cut-out 80 in the top surface 35 of the receptacle 34 and transversely positions the arm 40. The plunger housing 166 has a rectangular body so as to be readily welded to the leg 178 at a disposition such that the outer face 165 thereof substantially abuts the interior facing surface 64 of the arm 40 when in the locking position. The pin 170 is urged to normally extend through the face 165 and is controlled by the cam actuator 72 in the same manner as in the first embodiment. The leg 178 may have a tang 182 which is received within a cut-out (not illustrated) in the bottom wall of the receptacle 34 when the bracket 154 is in the locking position and acts to further secure the bracket in the locking position. In substantially all other respects the locking means in this embodiment is the same as in the first embodiment and functions in the same manner.

Numerous alterations of the structure herein disclosed will suggest themselves to those skilled in the art. However, it is to be understood that the present disclosure relates to the preferred embodiment of the invention which is for purposes of illustration only and not to be be construed as a limitation of the invention. All such modifications which do not depart from the spirit of the invention are intended to be included within the scope of the appended claims.

Having thus set forth the nature of the invention, what is claimed herein is:

1. Apparatus for use with wheel lift towing equipment for supporting the tires of a vehicle lifted and towed thereby, said apparatus comprising a transversely elongated tow bar adapted to be positioned beneath said vehicle, mounting means for carrying a cradle at a respective opposite end portion of said tow bar for supporting a respective tire of said vehicle, each of said cradles having front support means for supporting a front surface portion of the respective tire and rear support means for supporting a rear surface portion thereof, said rear support means including an elongated arm and tire engaging means extending transversely to the arm, adjustable means for mounting said arm at a respective end portion of said tow bar such that said tire engaging means is appropriately spaced from said front support means, said adjustable means comprising a receptacle carried by said mounting means, said receptacle having a passageway extending generally horizontally in a front to rear direction for telescopically receiving said arm, said arm having a plurality of bores spaced apart in the direction of elongation of said arm, and locking means for securing said arm within said receptacle, said locking means comprising a bracket pivotably mounted for movement relatively to said receptacle from an unlocked position where the bracket permits movement of the arm within the receptacle to a locking position, said bracket including a leg carrying stop means for substantially abutting a lateral surface of said arm when in the locking position to substantially preclude lateral movement of the arm, and said stop means carrying an extendible locking pin adapted for receipt within a selected one of said bores to lock the arm to the receptacle.

2. Apparatus as recited in claim 1, wherein said bracket is pivotably mounted for movement about a horizontal axis.

3. Apparatus as recited in claim 1, wherein said bracket is mounted on said receptacle.

4. Apparatus as recited in claim 3, wherein said bracket is pivotably mounted for movement about a horizontal axis.

5. Apparatus as recited in claim 4, wherein said receptacle includes top, bottom and lateral walls defining said passageway, said bracket including a plate, means for journally mounting said plate for rotation on said top wall from a position above said top wall to a position where it is substantially disposed on said top wall when in the locked position.

6. Apparatus as recited in claim 5, wherein said leg is fixed to and disposed substantially perpendicular to said plate and extends downwardly therefrom when said plate is disposed on said top wall, said bores being disposed in said lateral surface of said arm, said stop means being disposed substantially perpendicular to said leg, and said pin having an axis disposed substantially horizontally.

7. Apparatus as recited in claim 6, wherein said stop means comprises a second leg, said second leg carrying a housing slidably journalling said pin.

8. Apparatus as recited in claim 6, wherein said stop means comprises a housing affixed to said leg, and said pin is slidably journalled in said housing.

9. Apparatus as recited in claim 6, wherein the axis of said pin is substantially parallel to the axis about which said bracket pivots.

10. Apparatus as recited in claim 6, wherein said receptacle includes a slot in said top, said slot opening at the front of said top wall, and said leg being disposed downwardly through said slot when said plate is disposed on said top wall.

11. Apparatus as recited in claim 1, wherein said receptacle includes top, bottom and lateral walls defining said passageway, said passageway having a mouth opening at the front thereof which is larger than the opening of the passageway at the rear thereof, said leg closing a portion of said mouth when said bracket is in the locked position.

12. Apparatus as recited in claim 11, wherein said bracket is mounted on said receptacle.

13. Apparatus as recited in claim 12, wherein said bracket is pivotably mounted for movement about a horizontal axis.

14. Apparatus as recited in claim 13, wherein said bracket includes a plate, means for journally mounting said plate for rotation on said top wall from a position above said top wall to a position where it is substantially disposed on said top wall when in the locked position.

15. Apparatus as recited in claim 14, wherein said leg is fixed to and disposed substantially perpendicular to said plate and extends downwardly therefrom when said plate is disposed on said top wall, said bores being disposed in said lateral surface of said arm, said stop means being disposed substantially perpendicular to said leg, and said pin having an axis disposed substantially horizontally.

16. Apparatus as recited in claim 15, wherein said stop means comprises a second leg, said second leg carrying a housing slidably journalling said pin.

17. Apparatus as recited in claim 16, wherein the axis of said pin is substantially parallel to the axis about which said bracket pivots.

18. Apparatus as recited in claim 15, wherein said stop means comprises a housing affixed to said leg, and said pin is slidably journalled in said housing.

19. Apparatus as recited in claim 18, wherein the axis of said pin is substantially parallel to the axis about which said bracket pivots.

20. Apparatus as recited in claim 11, wherein said receptacle includes a slot in said top, said slot opening at the front of said top wall, and said leg being disposed downwardly through said slot when said plate is disposed on said top wall.

* * * * *